Geo. S. Zeigenfoss Impr'm in Wagon Clip.
73686
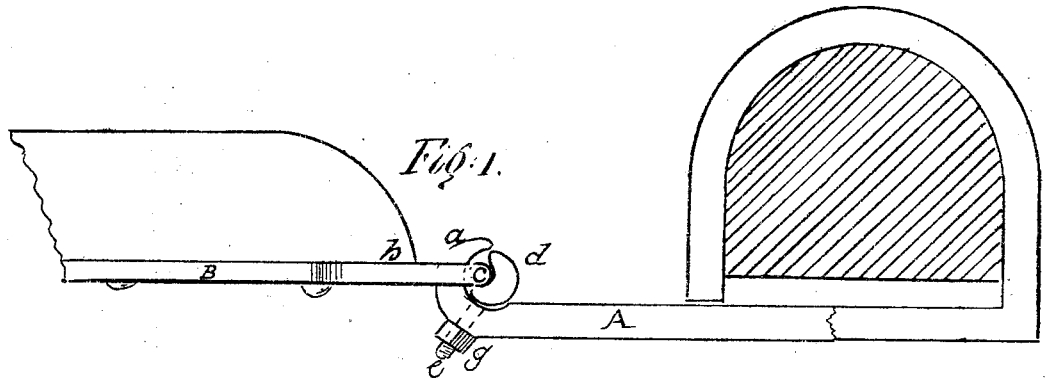
PATENTED
JAN 21 1868
Witnesses:
Theo Tusche
Wm Guwin
Inventor:
Geo S Zeigenfoss
Per Hemm
Attorneys

United States Patent Office.

GEORGE S. ZEIGENFUSS, OF DOYLESTOWN, PENNSYLVANIA.

Letters Patent No. 73,686, dated January 21, 1868; antedated January 16, 1868.

---

IMPROVEMENT IN WAGON-CLIP.

---

The Schedule referred to in these Letters Patent and making part of the same.

---

TO ALL WHOM IT MAY CONCERN:

Be it known that I, GEORGE S. ZEIGENFUSS, of Doylestown, Bucks county, Pennsylvania, have invented a new and improved Clip for Wagons; and I do hereby declare that the following is a full, clear, and exact description thereof, which will enable others skilled in the art to make and use the same, reference being had to the accompanying drawings, forming part of this specification, in which—

Figure 1 is a side view of my improved hinge-coupling, applied to a wagon.

Figure 2 is a top view.

Similar letters of reference indicate corresponding parts.

This invention relates to an improvement in the coupling for a wagon or carriage-clip and pair of shafts, and for other purposes to which it may be applicable, and consists in projecting from the front side of the clip a part thereof, and turning up the end, to form a semicircular hook, within which is placed a loop made on the end of the shaft-iron, to be held in place by a segmental-headed screw, that passes through the piece projecting from the clip, and is secured by a nut on the under side. This coupling makes a perfect hinge for the thills, which can be attached to and detached from the wagon thereby with great facility, to change the wagon as desired, for using either shafts or a tongue for the draught.

A represents the projecting piece from a wagon-clip, made otherwise in the usual way, the end of which is turned up, to form a perfectly semicircular hook, a, within which hook is placed the round cross-head c of a loop, b, that is made on the end of the bottom iron B, of a pair of carriage-shafts. The loop b is held in place in the hook by a segmental head, d, of a screw, e, that passes through a hole in the bottom of the hook a, to which it is firmly secured by a nut, g. The manner of applying this hinge-coupling will be readily understood.

Having thus described my invention, what I claim as new, and desire to secure by Letters Patent, is—

The segmental head d, having a screw, e, which passes diagonally through the curved projection a, on the end of the thill-iron A, for the purpose of securing the looped thill-iron B, all constructed and used as specified.

The above specification of my invention signed by me, this 11th day of March, 1867.

GEORGE S. ZEIGENFUSS.

Witnesses:
S. A. SMITH,
S. A. KRONER.